Dec. 13, 1966   M. E. BROWN   3,291,022
EXPOSURE CONTROL SYSTEMS FOR CAMERAS
Filed Jan. 13, 1964

MORRIS E. BROWN
INVENTOR.

BY R Frank Smith
Robert W Hampton
ATTORNEYS 3,291,022
EXPOSURE CONTROL SYSTEMS FOR CAMERAS
Morris E. Brown, Rochester, N.Y., assignor to Eastman Kodak Company, Rochester, N.Y., a corporation of New Jersey
Filed Jan. 13, 1964, Ser. No. 337,221
4 Claims. (Cl. 95—64)

The present invention relates to a camera in which an exposure regulating device such as a diaphragm or shutter is normally controlled by a photoelectric system. More particularly the invention concerns means for automatically adjusting such regualting device to an intermediate setting, corresponding to average scene brightness, in the event the photoelectric exposure control system fails.

In a typical camera of this type failure of the electrical system, such as from a dead battery, permits the exposure regulating device to be set by a spring to one of its extreme positions. Such electrical failure thus causes an average scene to be overexposed or underexposed quite badly. Often there is no means provided in the camera to apprise the camera operator of such failure and much film can be wasted before he becomes aware of it.

It is therefore an important object of the invention to automatically adjust an exposure regulating member of a camera to an intermediate setting upon failure of a photoelectric system that normally adjusts that member in accordance with scene brightness.

Figure 1:
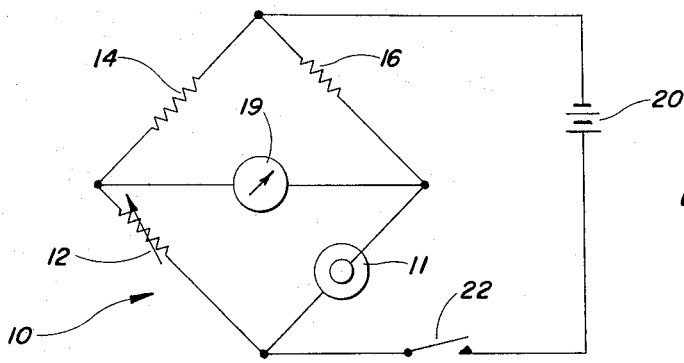
Figure 2:
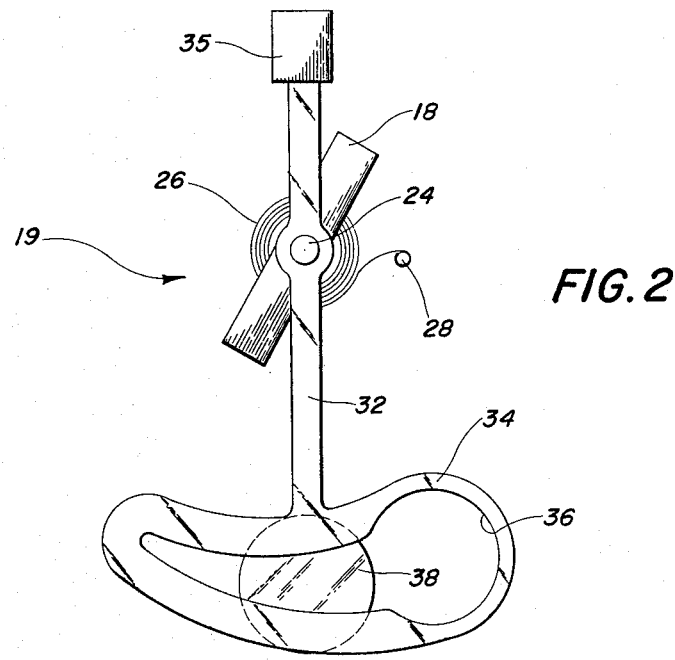

Other objects of the invention will appear from the following description, reference being made to the accompanying drawing, wherein:

FIG. 1 is a front view of an exposure regulating member, illustrated as a lens diaphragm, controlled according to the invention; and FIG. 2 is an electrical wiring diagram of one form of control circuit.

Referring to the drawings, one leg of a Wheatstone bridge 10 comprises a photoresistive element 11 and the other legs of the bridge comprise resistors 12, 14 and 16, one or more of which may be variable. The junction of element 11 and resistor 16 is bridged to the junction of resistors 12 and 14 by a pivoted coil 18 of an eletrical measuring instrument 19. The Wheatstone bridge 10 is energized by a battery 20 through a switch 22, which is closed in any desired manner to initiate operation of the circuit.

Coil 18 is pivoted at 24 and when not energized is maintained at a predetermined position, intermediate in its range of positions, by a spring 26, one end of which is secured to the coil and the other end of which is anchored on a pin 28.

Coil 18 carries an arm 32 supporting an exposure regulating member, illustrated as a diaphragm vane 34, and supporting a counterweight 35. Vane 34 has a teardrop aperture 36 cooperating with the taking lens 38 of the camera.

The operation of the system is as follows:

When the Wheatstone bridge is energized the photoresistive element 11 controls energization of instrument 19 as a function of scene brightness and the instrument coil 18 positions vane 34 over lens 38 accordingly to regulate exposure of film in the camera. The instrument is energizable in either of two polarities, according to the bridge balance, and overcomes the tension of spring 26 for positioning vane 34 anywhere within its range.

However, when bridge 10 becomes de-energized, for example through battery failure or an open circuit in the battery leads, no power is supplied to instrument 19. Accordingly, the diaphragm vane 34 is maintained by spring 26 in its preselected intermediate position. This position is selected so as to expose the film properly for an "average" scene brightness, the value of which is determined from statistical analysis of numerous amateur photographs.

The invention has been described in detail with particular reference to a preferred embodiment thereof, but it will be understood that variations and modifications can be effected within the spirit and scope of the invention as described hereinabove and as defined in the appended claims.

I claim:

1. An exposure control system for cameras, comprising in combination: a Wheatstone bridge having four legs and a bridging circuit, each of said legs comprising a respective resistive impedance, and one of said impedances comprising a photoresistive element illuminatable by scene light; an electric measuring instrument in said bridging circuit; a battery connected to said Wheatstone bridge for energizing said instrument under control of said photoresistive element; an exposure regulating device having a range of operating positions; resilient means urging said regulating device to a predetermined position intermediate in said range; and means controlled by said instrument for normally overcoming said resilient means to move said regulating device to a position within said range corresponding to the level of illumination of said photoresistive element.

2. An exposure control system for cameras, comprising in combination: a Wheatstone bridge having four legs and a bridging circuit, one of said legs comprising a photoresistive element illuminatable by scene light; an electric measuring instrument in said bridging circuit; a battery connected to said Wheatstone bridge for energizing said instrument under control of said photoresistive element; an exposure regulating device having a range of operating positions, resilient means urging said regulating device to a predetermined position intermediate in said range; and means controlled by said instrument for normally overcoming said resilient means to move said regulating device to a position within said range corresponding to the level of illumination of said photoresistive element.

3. An exposure control system for cameras, comprising in combination: a Wheatstone bridge having four legs and a bridging circuit, one of said legs comprising a photoresistive element illuminatable by scene light; an electric measuring instrument in said bridging circuit; a battery connected to said Wheatstone bridge for energizing said instrument under control of said photoresistive element; an exposure regulating device having a range of operating positions; means normally controlled by said instrument for positioning said regulating device in accordance with illumination of said photoresistive element; and resilient means connected to said regulating device so that during operation said means for positioning said regulating device must overcome the force of said resilient means, said resilient means being effective, upon de-energization of said instrument, for moving said regulating device to a predetermined position intermediate in said range.

4. An exposure control system for a camera comprising an exposure regulating device having a range of operating positions, driving means coupled to said device for changing its position within said range, means providing current of either of two polarities to the driving means, and resilient means normally overcome by the driving means and coupled to said exposure regulating device tending to move said device toward a predetermined position intermediate the ends of said range of positions, so that when the driving means loses its force, the exposure regulating device will assume a position intermediate the ends of said range of positions.

References Cited by the Examiner

UNITED STATES PATENTS

| 3,150,581 | 9/1964 | Wilharm | 95—64 |
| 3,183,808 | 5/1965 | Teshi et al. | 95—64 |

FOREIGN PATENTS 1,223,439  2/1960  France.

NORTON ANSHER, *Primary Examiner.*
CLIFFORD B. PRICE, *Assistant Examiner.*

Disclaimer 3,291,022.—*Morris E. Brown*, Rochester, N.Y. EXPOSURE CONTROL SYSTEMS FOR CAMERAS. Patent dated Dec. 13, 1966. Disclaimer filed Sept. 16, 1969, by the assignee, *Eastman Kodak Company*.

Hereby enters this disclaimer to claims 1 through 4, inclusive, of said patent.

[*Official Gazette October 28, 1969.*]